Figure 1:
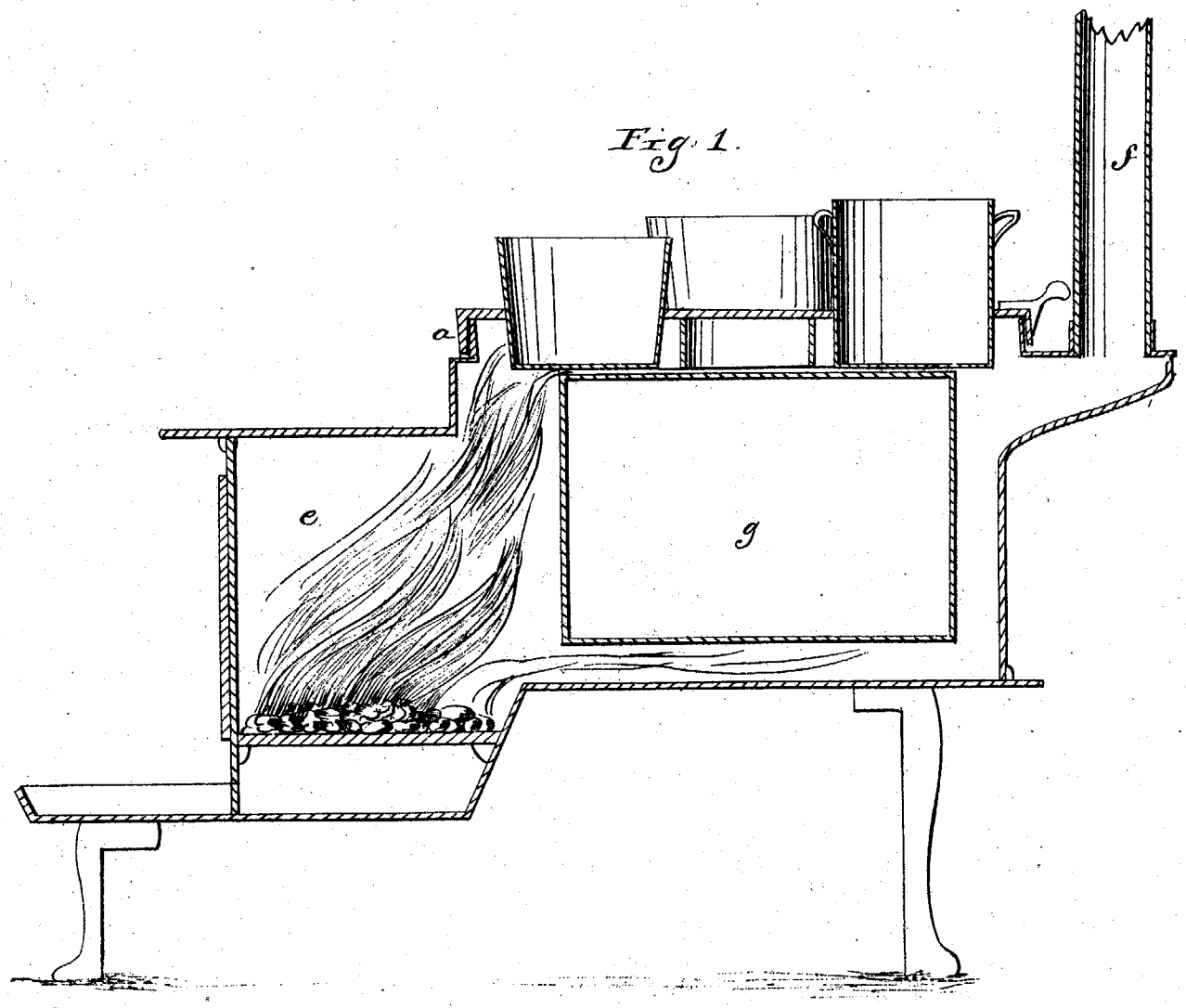
Figure 2:
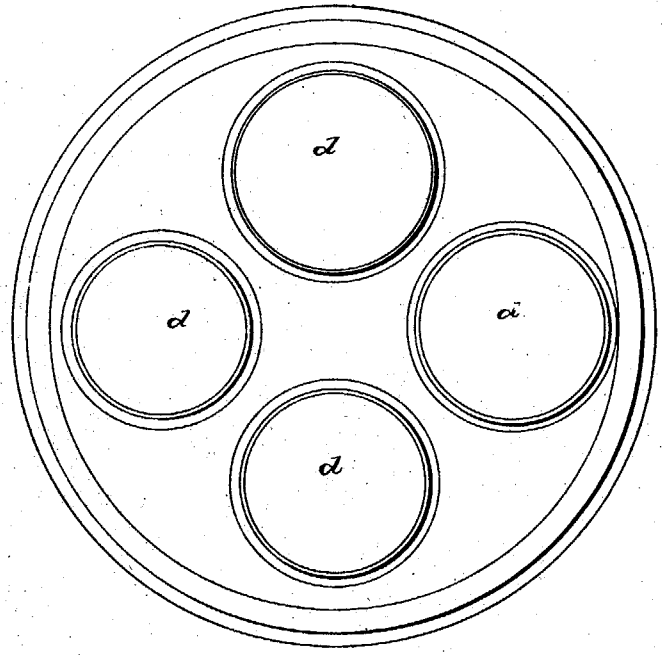
Figure 3:
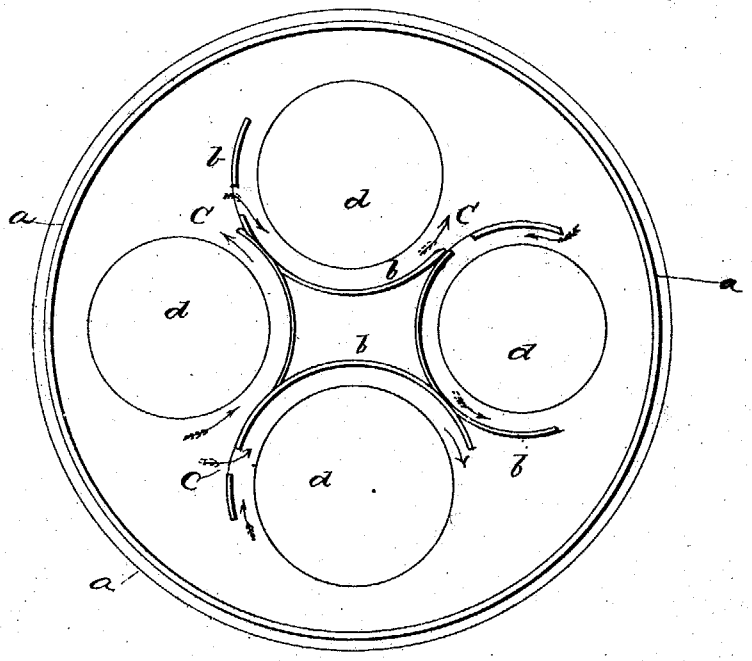

9451X

2 Sheet—Sheet 1.

M. FRENCH.

Cook Stove.

Patented Mar. 2, 1836.

N. PETERS, Photo-Lithographer, Washington, D. C.

9451X

2 Sheet—Sheet 2.

M. FRENCH.

Cook Stove.

Patented Mar. 2, 1836.

N. PETERS, Photo-Lithographer, Washington, D. C.

3/2/1836 9451X

Maynard French . Albany New York
Letters Patent dated March 2d 1836

The Schedule referred to in these Letters Patent and making part of the same containing a description in the words of the said Maynard Fr[illegible]
himself of his improvement in the Caps or Caps for Rotary Stoves.
To all to whom these presents shall come Be it Known that I Ma
nard French of the City and county of Albany and State of New Yo
Have invented a new and useful improvement in the constr
tion and adaption to to use, of an elevated Cap, to be applied to
and Furnaces, And that the following is a full and accurate
description and Specification thereof. The improvements and i
tions claimed by the said Maynard French, consists First,
an elevation of the crown or top of the cap, from its bearing [illegible]
Stove, of about three inches and an half, for an ordinary size
Stove. This elevation however is to be increased or diminished
according to the various sizes of Stoves to which the caps may
applied. Second. In the Construction and arrangement of the
by means of partitions, adapted to the number, shape and sizes
Boilers and other implements used in the Stove. These part
are or may be either circular, angular, square parallelogra-
or any other convenient, useful or desirable shape or form.
When the partitions are circular, they extend close to the upper p
of the Stove, with semicircular, or other shaped openings on the
under edge of all the partitions to permit the Smoke and
to pass from one chamber to another, which are formed [illegible]
the partitions, freely, around and under the bottoms of
boilers and other implements used in the cap of the [illegible]
The elevation may be perpendicular, inclining or circul[illegible]
The outer rim may be made of any convenient or desi[illegible]
width and may be plain or constructed with c[illegible]
the purpose of being moved by a pinion. The cap 3/2/1836 9451x be moved by a knob, leaver or rack and pinion , and upon a plane
bearing or upon rollers, thereby giving to it a circular or rotary m
tion on the top of the stove, to which it may be applied. The [illegible]
cap may be constructed with an increased or diminished numb
of openings, and it is in all instances, to be adapted to the particular
use or business to which it is to be applied. The cap is to be made
of cast or any kind of malleable metal, Iron Copper and b[illegible]
are the best. This cap and all the variously constructed ones, on
the principles herein described, may be adapted and applied to the [illegible]
and description of Stoves as are described Specified and patented [illegible]
Henry Stanley & Elisha Town, both of the State of Vermont [illegible]
a common Stationary or moveable stove or furnace, either of clay
or metal; and the heat may be communicated to the boilers and
other implements in the said cap, either from the Stove or fur
nace to which the said Cap is applied or from any other Stove or
furnace. And the said Maynard French distinctly claims [illegible]
his invention and improvement, the elevation of the cap, or cap
The formation of the chambers, by the various partitions on the
underside of the cap or caps, the method of conveying the
Smoke and heat from chamber to chamber and the adapta
and application of the said caps to Stoves and furnaces as a[illegible]
described.

Albany Jan[illegible] 1836 Maynard French

Witnesses
W. W. Dougherty
Wm Cushing Schuyler

Exd (Rec'd & Recorded anew March 24. 1842)

(636 [illegible]

Drawing [illegible]